No. 885,156. PATENTED APR. 21, 1908.
J. G. HOLBOURNS & H. A. LONGHURST.
LINOTYPE MACHINE.
APPLICATION FILED APR. 1, 1907.

4 SHEETS—SHEET 1.

Witnesses

Inventors
John Glennie Holbourns
Henry Alexander Longhurst
per Chas. S. Woodroffe,
Attorney No. 885,156. PATENTED APR. 21, 1908.
J. G. HOLBOURNS & H. A. LONGHURST.
LINOTYPE MACHINE.
APPLICATION FILED APR. 1, 1907.

4 SHEETS—SHEET 2.

Witnesses
Inventors
John Glennie Holbourns
Henry Alexander Longhurst
per Chas S. Woodroffe,
Attorney No. 885,156. PATENTED APR. 21, 1908.
J. G. HOLBOURNS & H. A. LONGHURST.
LINOTYPE MACHINE.
APPLICATION FILED APR. 1, 1907

4 SHEETS—SHEET 3.

Witnesses
Inventors
Attorney

No. 885,156. PATENTED APR. 21, 1908.
J. G. HOLBOURNS & H. A. LONGHURST.
LINOTYPE MACHINE.
APPLICATION FILED APR. 1, 1907.

4 SHEETS—SHEET 4.

Witnesses

Inventors
John Glennie Holbourns
Henry Alexander Longhurst
per Woodroffe,
Attorney

UNITED STATES PATENT OFFICE.

JOHN GLENNIE HOLBOURNS AND HENRY ALEXANDER LONGHURST, OF LONDON, ENGLAND, ASSIGNORS TO LINOTYPE AND MACHINERY LIMITED, OF LONDON, ENGLAND, A COMPANY.

LINOTYPE-MACHINE.

No. 885,156.    Specification of Letters Patent.    Patented April 21, 1908.

Application filed April 1, 1907.   Serial No. 365,665.

*To all whom it may concern:*

Be it known that we, JOHN GLENNIE HOLBOURNS and HENRY ALEXANDER LONGHURST, subjects of the King of the United Kingdom of Great Britain and Ireland, and residing at 188 Fleet street, in the city of London, England, have invented new and useful Improvements in Linotype-Machines, of which the following is a specification.
This invention relates to linotype machines and has for its object to provide means for enabling the operator, by one operation, to adjust simultaneously the mold and the trimming knives, for effecting a change of body dimension in the linotype produced.

Figure 1:
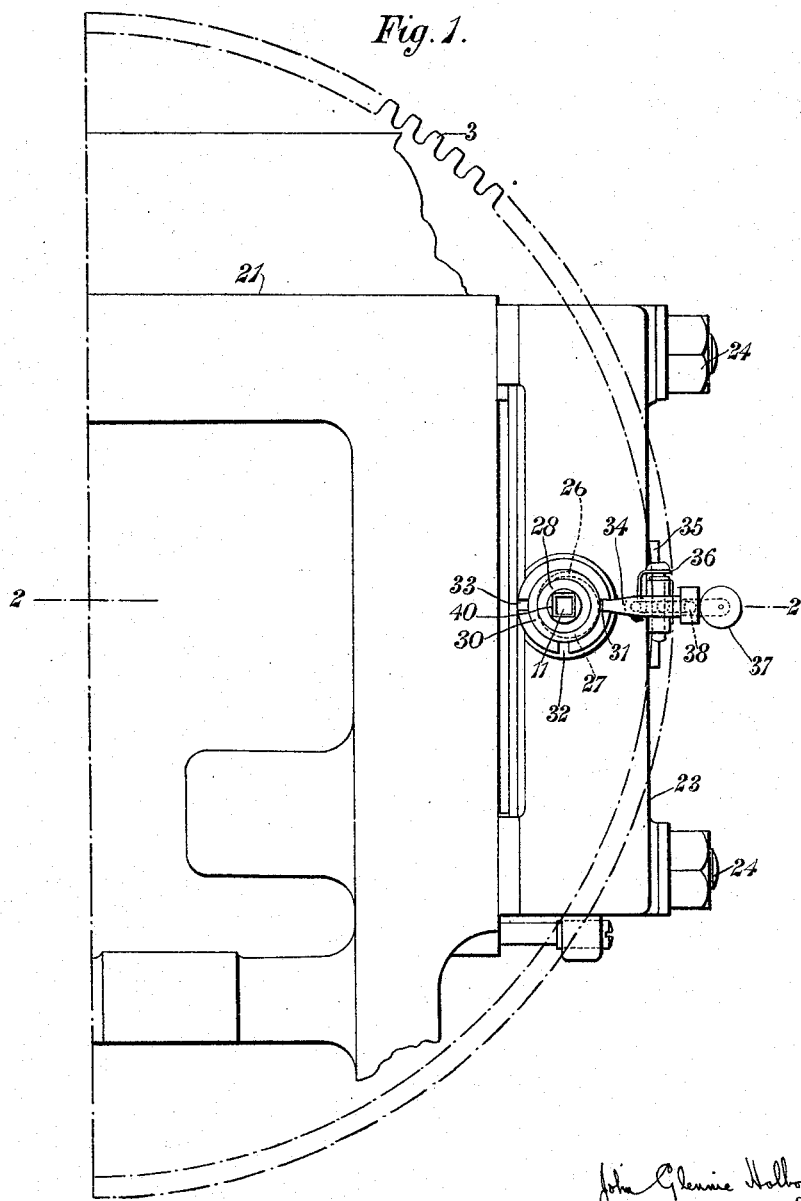
Figure 2:
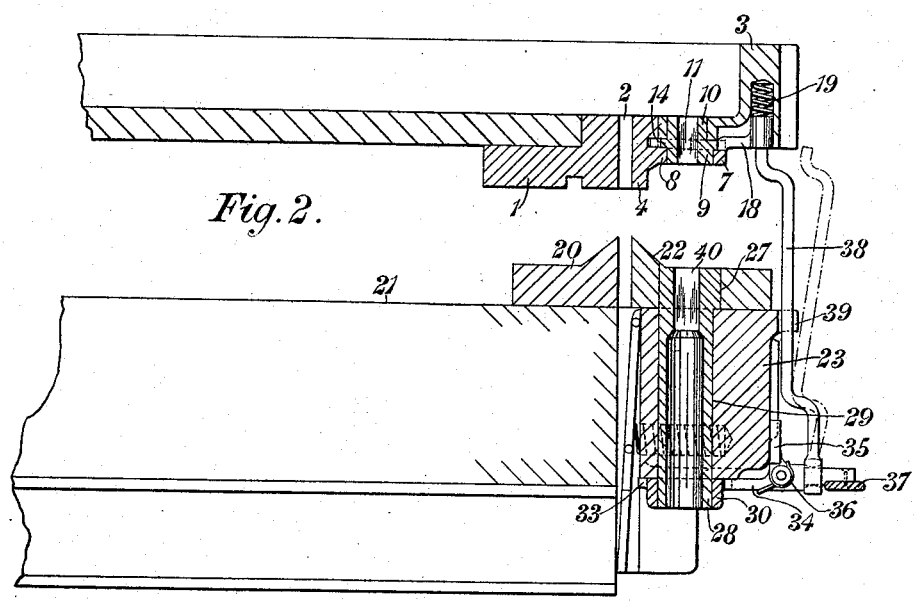
Figure 7:
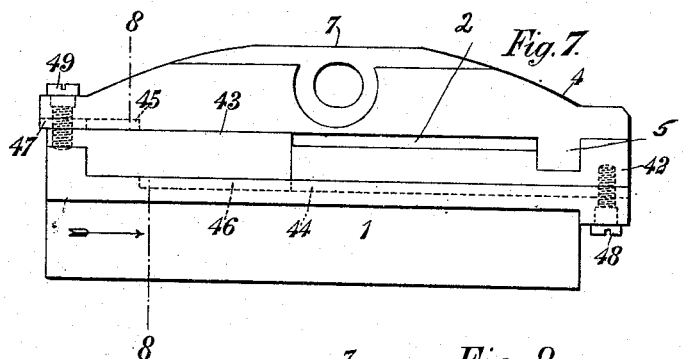
Figure 8:
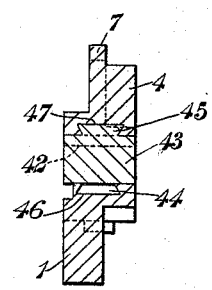
Figure 3:
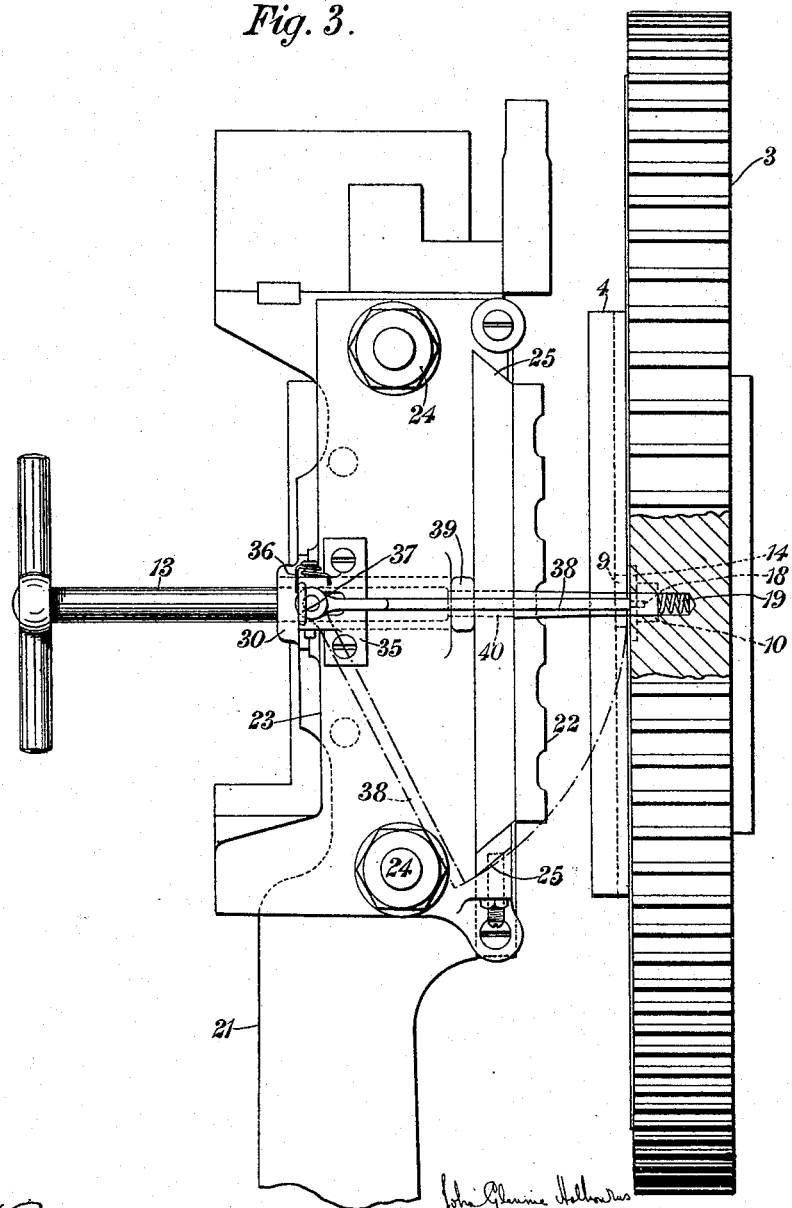
Figure 4:
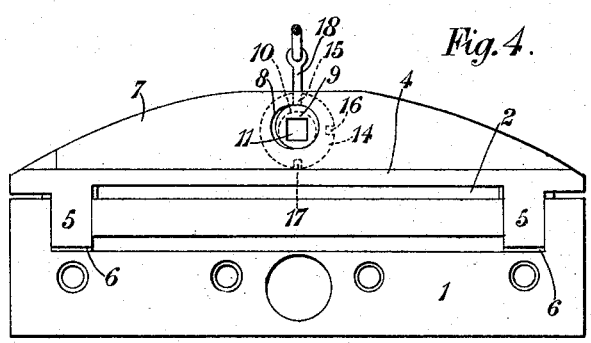
Figure 5:
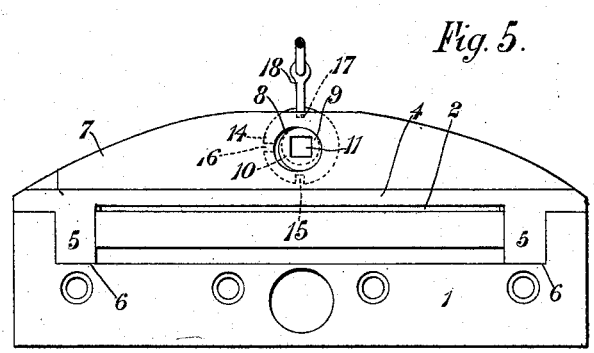
Figure 6:
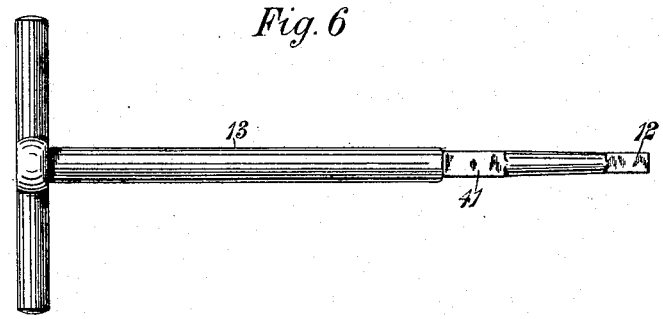

In the accompanying drawings, which are to be taken as part of this specification, and read therewith: Figure 1 is a front elevation of as much of a linotype machine as is necessary to illustrate the present invention: Fig. 2 is a horizontal section taken about on the line 2—2 of Fig. 1: Fig. 3 is an elevation as seen from the right-hand side of Fig. 1, with the mold wheel shown partly in vertical section: Figs. 4 and 5 are front elevations of the adjustable mold shown detached, and in two different conditions of adjustment: Fig. 6 is an elevation of the adjusting key: Fig. 7 is a rear elevation of a mold which is adjustable both for measure and body dimensions, and Fig. 8 is a vertical section on the line 8—8 of Fig. 7, as seen in the direction indicated by the arrow in the last named figure.

According to the present invention, the body piece 1 of the mold 2 is, as ordinarily, rigidly attached to the mold wheel 3, and the cap plate 4 is adapted to slide relatively to such body piece, being guided in such sliding movement by the projections 5, on the cap plate working in recesses 6 in the body piece 1, this sliding movement providing for the distance between the two opposed surfaces of the body piece 1 and cap plate 4 being increased and decreased as shown by the two Figs. 4 and 5, for effecting a corresponding increase and decrease in the above-named body dimension.

The cap plate 4, or more strictly speaking, the flange 7 thereof, is provided with a slotted bearing 8, Figs. 4 and 5, in which is rotatable an eccentric 9 conveniently integral with a concentric boss 10 free to rotate in a bearing in the mold wheel 3, as shown best in Fig. 2. This boss 10 is formed with a square or otherwise non-circular concentric hole 11 adapted to receive the correspondingly-shaped end 12, Fig. 6, of a key 13, and it is also provided with a concentric collar or flange 14 having notches 15, 16 and 17 adapted to be engaged by a tooth or detent 18 hereinafter termed a detent. The detent 18 is free to slide in a suitable recess in the mold wheel 3, in a direction parallel with the axis of rotation of the said wheel, see particularly Fig. 2, and it is acted upon by a compression spring 19 which constantly tends to move it into or retain it in, the engaging position in which it is represented in the drawings, but which also allows it to be pushed by the operator in the opposite direction and thereby disengaged from the collar 14, when the eccentric 9 is to be turned for altering the body dimension of the mold. The detent 18 is prevented from leaving the recess in which it is slidable, by the flange 7 of the cap plate 4 against which the spring presses it when it is in engagement with one or other of the notches 15, 16, 17; or any other suitable means may be provided for limiting the outward movement of the detent 18.

The fixed trimming knife 20 is secured to the vise frame 21 in the ordinary way, and the trimming knife 22 is adjustably mounted on the adjustable knife block 23 which, as ordinarily, is secured to the vise frame 21 by bolts and nuts 24. In the example illustrated, the adjustability of the trimming knife 22 is secured by providing the knife block 23 with a dovetail groove 25, Fig. 3, in which the said knife, by a part integral therewith of corresponding dovetail shape, is free to be moved in a horizontal direction. In the adjustable knife 22 there is provided a slotted bearing 26 (shown in dotted lines in Fig. 1) for an eccentric 27 formed on the rear end of a tubular shaft 28 which is free to rotate in a bearing 29 in the knife block 23, as shown best in Fig. 2. On the front end of the tubular shaft 28 is secured a flanged collar 30 having notches 31, 32 and 33, Fig. 1, with which is adapted to engage a detent 34 pivoted to a bracket 35 fast to the knife block 23 and acted upon by a coiled spring 36 which constantly tends to move the detent rearward into the position in which it engages the notches 31, 32 and 33. The detent 34 is provided with a suitable thumb plate or equivalent 37 by pressing upon which, the operator can readily disengage the said detent from one or other of the last named notches, and the said detent has pivotally connected with it one end of a push rod 38 capable of being adjusted to two different positions, as shown respectively in full and dotted lines in Fig. 3. In one of these positions, viz., that in which it is represented in dotted lines in Fig. 3, the push rod 38 is inoperative and out of reach of the mold wheel 3, and in the other position, viz., that in which it is shown in full lines, the push rod is supported by a suitable guide 39 on the knife block 23 in such position that when the mold wheel 3 is in the normal or linotype-ejecting position, and the thumb plate 37 is pressed upon by the operator to release the detent 34 from the particular notch 31, 32 or 33 with which it is then engaged, the rear end of the push rod 38 engages also with the detent 18 on the mold wheel 3 and releases it from its respective notched collar 14.

When it is desired to move the push rod 38 from its operative position into its inoperative position, the operator first moves it sidewise out of the guide 39, as shown in dotted lines in Fig. 2, and then lowers it on to the lower of the before-named nuts 24 which thereafter supports it in position until the operator next requires to effect an adjustment (for body dimension) of the mold and knives.

The tubular shaft 28 is provided with a square or otherwise non-circular concentric hole 40 adapted to receive a correspondingly shaped portion 41 of the key 13, which latter is insertible through the front end of the said shaft and, when so inserted, capable of engaging with both of the non-circular holes 11 and 40 as shown in Fig. 3, when the mold wheel 3 is in the normal position or that in which the linotypes are ejected from the mold.

It will thus be seen that when the operator requires to adjust the mold 2 and knife 22 for effecting a change of body dimension, all he has to do is to insert the key 13 in the non-circular holes 11, 40, press back the thumb plate 37 and turn the key 13 in the required direction, and, when the desired adjustment has been made, release the thumb plate 37 to allow the detents 18, 34 to reëngage their respective notches 15 and 31, 16 and 32, or 17 and 33, these notches being so situated as to give all gradations of body dimensions between, and including, the maximum and minimum which the machine is adapted to cast.

To enable the before described adjustable mold 2 to be adjusted for casting linotypes of different measure while maintaining the various juxtaposed surfaces which are, for variation of body dimension, in metal-tight sliding contact, the said mold, as shown in Figs. 7 and 8, is provided with a number of changeable liners 42, 43 one of each pair of which, viz., the liner 42, being adapted to be secured to the body piece 1, and the other liner 43 of the said pair, being adapted to be secured to the mold cap 4. The last-named attachments are preferably effected by means of dovetail ribs and grooves extending longitudinally of the liners and mold cap and body piece, the dovetail ribs 44, 45 preferably being on the liners 42, and 43 respectively, and the grooves 46, 47 being preferably in the body piece 1 and mold cap 4 respectively. The dovetail groove 46 in the body piece 1 is equal in length to the longest measure of linotype which it is required to cast in the mold 2, and the dovetail groove 47 in the cap plate 4 extends no further towards the opposite end of the mold than does the shortest liner 43 which is to be attached to the said cap plate as shown in dotted lines in Fig. 7, which arrangement for all adjustments, provides for the proper closing of the grooves 46, 47 against the access of the molten metal thereto. The liners 42 and 43 are secured to the body piece 1 and cap plate 4 respectively by screws 48, 49 respectively as shown in Fig. 7.

In the arrangement last described the cap plate 4 is formed with only one projection 5 which is adapted to slide within a recess in the liner 42 thus effectually closing, with a metal-tight closure, one end of the mold, the other end of which is correspondingly closed by the inner end of the liner 43 sliding in metal-tight contact with the juxtaposed outer end of the liner 42. By these means the cap plate 4 may be adjusted nearer to and farther from the body piece 1 for obtaining variations of body dimension without disturbing the metal-tight character of the just-mentioned closures.

We claim:—

1. In a linotype machine, the combination of a mold and trimming knives both adapted to be adjusted for obtaining linotypes of different body dimensions, and eccentrics operatively-connected with the mold and one of the knives for effecting the said adjustments these eccentrics being in alinement with each other when the mold is in the ejecting position, and adapted to be rotated simultaneously about a common axis.

2. In a linotype machine, the combination with a mold body, a mold cap slidable on the body for varying the body dimension of the linotypes to be cast, a fixed knife adapted to trim one side of the linotypes, and a knife adjustable relatively to the fixed knife adapted to trim the other side of the linotypes, of an eccentric rotatable in the mold cap, and another eccentric rotatable in the adjustable knife, adapted to adjust these two parts, the two eccentrics being in alinement with each other when the mold is in the ejecting position, and adapted to be rotated simultaneously about a common axis.

3. In a linotype machine, the combination of a mold and trimming knives both adapted to be adjusted for obtaining linotypes of different body dimensions, alined eccentrics operatively-connected with the mold and one of the knives respectively, for effecting the said adjustments, and devices operatively connected with the eccentrics adapted to lock them in their adjusted positions.

4. In a linotype machine, the combination of a mold and trimming knives both adapted to be adjusted for obtaining linotypes of different body dimensions, alined eccentrics operatively connected with the mold and one of the knives respectively, for effecting the said adjustments, notched collars fast to the eccentrics, and detents adapted to engage with and be disengaged from the notches of the collars.

5. In a linotype machine, the combination of a mold and trimming knives both adapted to be adjusted for obtaining linotypes of different body dimensions, alined eccentrics operatively connected with the mold and one of the knives respectively, for effecting the said adjustments, notched collars fast to the eccentrics, detents adapted to engage the notches of the collars, springs adapted to effect such engagement, and a device operatively connected with one of the detents and adapted to transmit motion to the other detent.

6. In a linotype machine, the combination of a mold and trimming knives both adapted to be adjusted for obtaining linotypes of different body dimensions, an eccentric rotatable in the mold cap, a bearing for the eccentric in the mold wheel, the said mold wheel, a notched flange fast to the eccentric, a spring-pressed detent adapted to engage the notches of the flange, a recess in the mold wheel within which the detent is movable, an eccentric rotatable in the movable knife and alined with the eccentric which is rotatable in the mold cap, a tubular shaft fast to the said eccentric, a bearing for the tubular shaft in the knife block, the said knife block, a notched flange on the tubular shaft, a spring-pressed detent adapted to engage the notches of the last-named flange, and an adjustable rod adapted to communicate motion to one detent when the other one is operated.

7. In a linotype machine, the combination with a mold the cap of which is adapted to be adjusted for obtaining linotypes of different body dimensions, of dovetail grooves in and extending longitudinally of the mold body and mold cap, changeable liners attachable to the mold body and mold cap, and dovetail ribs on the liners adapted to engage with the said grooves.

In witness whereof we have hereunto set our hands in the presence of two witnesses.

JOHN GLENNIE HOLBOURNS.
HENRY ALEXANDER LONGHURST.

Witnesses:
WARWICK HY. WILLIAMS,
WM. SOUTHERLAND ROBINSON.